United States Patent [19]
Miyamoto et al.

[11] Patent Number: 6,001,440
[45] Date of Patent: Dec. 14, 1999

[54] HEAT-CONDUCTIVE POLYIMIDE FILMS, PROCESS FOR THEIR PREPARATION AND THEIR USE

[75] Inventors: Tsuneo Miyamoto, Moriyama; Takashi Kuraoka, Kusatsu; Junya Kanetake, Moriyama; Naoki Nishiura, Moriyama; Nobuaki Kobayashi, Moriyama; Tetsuo Sadamitsu, Moriyama, all of Japan

[73] Assignee: Gunze Limited, Kyoto, Japan

[21] Appl. No.: 08/955,615

[22] Filed: Oct. 22, 1997

[30] Foreign Application Priority Data

Oct. 23, 1996 [JP] Japan ................................ 8-299632

[51] Int. Cl.⁶ .............................. G03G 15/20; B28B 1/20
[52] U.S. Cl. .................... 428/36.9; 428/36.91; 428/338; 428/421; 428/473.5; 428/34.5; 524/429; 524/430; 524/433; 264/311; 399/330
[58] Field of Search ................................ 428/34.5, 35.7, 428/35.8, 36.9, 36.91, 338, 421, 422, 473.5; 264/311; 492/54; 399/329, 330; 524/430, 429, 433, 437

[56] References Cited

U.S. PATENT DOCUMENTS

| | | | |
|---|---|---|---|
| 5,149,941 | 9/1992 | Hirabayashi et al. | 219/216 |
| 5,411,779 | 5/1995 | Nakajima et al. | 428/36.91 |
| 5,582,886 | 12/1996 | Kitajima et al. | 428/36.91 |
| 5,658,670 | 8/1997 | Fukushi et al. | 428/421 |
| 5,720,703 | 2/1998 | Chen et al. | 492/54 |
| 5,763,129 | 6/1998 | Chen et al. | 492/54 |
| 5,778,295 | 7/1998 | Chen et al. | 399/329 |
| 5,853,892 | 12/1998 | Chen et al. | 428/421 |
| 5,855,977 | 1/1999 | Fukushi et al. | 428/421 |

FOREIGN PATENT DOCUMENTS

| | | |
|---|---|---|
| 62-3980 | 1/1987 | Japan . |
| 6-222965 | 8/1994 | Japan . |
| 7-18162 | 1/1995 | Japan . |
| 7-110632 | 4/1995 | Japan . |
| 7-186162 | 7/1995 | Japan . |

*Primary Examiner*—Rena L. Dye
*Attorney, Agent, or Firm*—Kubovcik & Kubovcik

[57] ABSTRACT

The present invention relates to a heat-conductive polyimide film comprising a heat-conductive powder dispersed therein with a concentration gradient. The film can be produced, for example, by centrifugal casting. The film can be used as an excellent component or member in those fields in which heat conductivity is required in addition to mechanical characteristics, heat resistance and chemical resistance. For example, it is used as a thermal fixation member in a laser printer.

7 Claims, 3 Drawing Sheets

F i g. 1
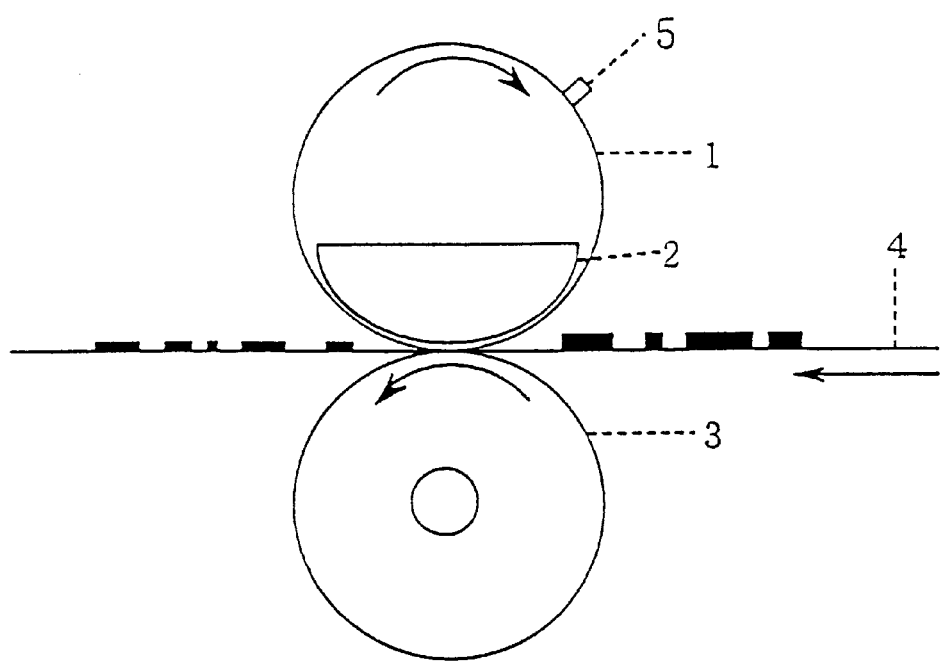

HEAT-CONDUCTIVE POLYIMIDE FILMS, PROCESS FOR THEIR PREPARATION AND THEIR USE

FIELD OF THE INVENTION

The present invention relates to a heat-conductive polyimide film, a process for producing the same, and a use thereof.

BACKGROUND OF THE INVENTION

Polyimides are generally excellent in heat resistance, antistatic property and mechanical properties, among other characteristics, and are used in various fields. Particularly, in the field of laser printers and electrophotographic copying machines, for instance, the use of them as parts or members (rolls or belts) for heating for fixation of toner images on toner image acceptors (paper, carton, OHP (overhead projector) sheets, etc.) is under investigation. In using them as such heating and fixing members, they are required to be high in thermal conductivity as well. Organic polymers are essentially low in thermal conductivity and rather heat-insulating. The same is true of polyimides.

Therefore, various measures have been taken to increase the thermal conductivity. A simple approach toward this goal is to reduce the thickness. This indeed increases the thermal conductivity but can meet sophisticated requirements only to a limited extent. In addition, it affects mechanical characteristics (in particular flex resistance, scratch resistance, etc.) adversely. Therefore, it can never be a satisfactory means of solution.

As an attempt to essentially improve the thermal conductivity, it has been proposed to admix a known thermal conductivity providing agent with polyimides, as can be seen, for example, in Japanese Kokai Tokkyo Koho S62-3980, H07-110632 and H07-186162.

It is common to the technologies disclosed in the above-cited references to employ a heat-conductive cylindrical polyimide film containing a thermal conductivity providing agent uniformly dispersed therein as an inner layer and laminate thereon an outer layer of a resin such as a non-heat-conductive polyimide or a fluororesin, for the purpose of heating and fixation in copying machines.

Meanwhile, in mixing various additives in general, inclusive of the thermal conductivity providing agent mentioned above, with various resins, inclusive of polyimides, it is an essential goal to attain as uniform mixing and dispersion as possible. For promoting the expression of required performance characteristics, it is also necessary to increase the amounts of the additives. The addition of the additives indeed markedly improves the performance characteristics but antinomically deteriorates the mechanical characteristics inherent in the resins. This applies to the technologies of the above-cited references as well. A means for preventing said characteristics deterioration is to increase the film thickness. This, however, tends to make the film more rigid and deficient in flexibility, resulting in loss of the film characteristics.

BRIEF SUMMARY OF THE INVENTION

The present invention is a fruit of intensive investigations made in view of the above-mentioned problems in the prior art. It is, therefore, an object of the present invention to avoid decreases in the mechanical characteristics inherent in polyimides as far as possible and provide a polyimide film having high heat conductivity, a process for producing the same, and a use of the same.

BRIEF DESCRIPTION OF THE DRAWINGS

FIG. 1 is a side view of an exemplary roll mechanism in the fixation part of a copying or printing machine.

DISCLOSURE OF THE INVENTION

Figure 2:
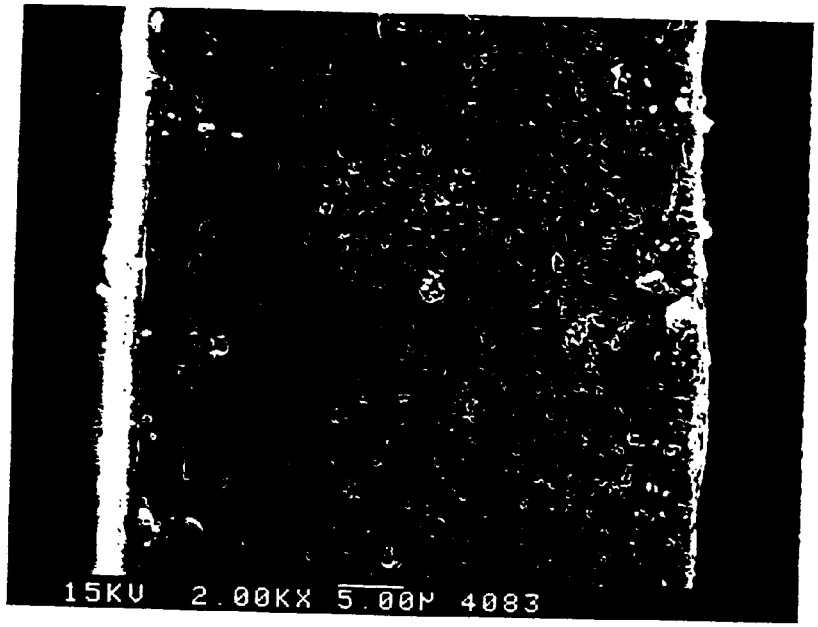
FIG. 2 is an electron photomicrograph of the film obtained in Example 1.

First, the heat-conductive polyimide film of the present invention contains a heat-conductive powder dispersed therein with a concentration gradient, as claimed in claim 1.

Said heat-conductive polyimide film can be produced, for example by subjecting a polyimide precursor solution containing 10 to 30% by weight of a heat-conductive powder to centrifugal casting and heating the thus-obtained endless, cylindrical polyimide precursor film to thereby cause the imide ring closure reaction to proceed, as claimed in claim 7.

A planar film for use in a multilayer printed IC (integrated circuit) board can be obtained, for example by cutting the endless, cylindrical polyimide film obtained as mentioned above.

As regards the use thereof, said heat-conductive polyimide film, particularly the heat-conductive, thermosetting aromatic polyimide film in an endless cylindrical form, as claimed in claim 5, can be used also as a toner heating and fixation component member of a laser printer, for instance.

The invention is described below in detail.

The heat-conductive powder is dispersed in the polyimide film with a concentration gradient. The expression "dispersed with a concentration gradient" means that the powder is dispersed in said film with a substantially continuous concentration gradient in the direction of thickness of the film. Therefore, said film is essentially different from those polyimide films in which such a powder is dispersed uniformly throughout. The continuous gradient in the state of dispersion may be either from the reverse side to the face side or from the face side to the reverse side. When, for instance, the face side is to be used for heating an article to be heated, it is desirable that said powder is in a state such that its dispersion concentration gradually increases from the reverse side to the face side. The angle of the concentration gradient can be varied freely according to the addition level, shape and form, specific gravity and method of production of said powder, among others, hence said angle is arbitrary. This state of dispersion can easily be confirmed by electron photomicrography of the section, as shown in FIG. 2 to FIG. 5.

The heat-conductive powder may be any of those generally known inorganic powders having a high heat conductivity. As examples, there may be mentioned simple substance metals such as copper, nickel and aluminum, magnesium oxide, potassium titanate, mica, silica, titanium oxide, boron nitride, aluminum oxide, silicon carbide, beryllium oxide, aluminum nitride, and silicon. When the film is required to have an electrical insulating quality, boron nitride, aluminum oxide, beryllium oxide and aluminum nitride are preferred among the examples mentioned above, as claimed in claim 2. Basically, these are used singly for gradient dispersion construction. It is also possible, however, to use two or more of them for the same purpose.

The polyimide in general is a synthetic organic polymer at least containing an imide bond as a repeating unit and includes two types, thermoplastic and thermosetting (heat curing). These are of course required to be capable of forming films having film characteristics.

The thermoplastic polyimide is one generally called a polyetherimide in which at least two oxygen atoms are contained in a main-chain organic group generally bound to imide groups. This polymer melts at about 400° C. and therefore can be molded by extrusion. On the other hand, the thermosetting polyimide has no melting point and can not be molded at this polyimide stage. For molding into the form of a film, two steps are necessary, namely the step of molding a film at the stage of a polyimide precursor (hereinafter referred to as "poly(amic acid)") and the step of heating the precursor film to effect imide ring closure to convert said film to the desired polyimide film.

Said organic group and said polyimide precursor may be aromatic or aliphatic but for the polyimide film to have sufficient heat resistance, chemical resistance and mechanical characteristics all in one, they are preferably aromatic. Polyamide-imides in which, in addition to an imide group, an amide group also occurs as a repeating unit, may also be mentioned as examples of the polyimide. As a typical polyamide-imide, there may be mentioned Torlon (trademark; product of Amoco), for instance.

Said polyimide has the form of a film. This film may be planar or cylindrical depending on the intended use thereof. The thickness may vary also depending on the intended use but, generally, it is about 20 to 300 $\mu$m, preferably 20 to 50 $\mu$m, more preferably 20 to 40 $\mu$m.

In the practice of the present invention, the mechanical characteristics of the film are little influenced by the thinness thereof and, therefore, it is also possible to reduce the thickness of the film. This results in a more improved heat conductivity.

The ratio between the polyimide and heat-conductive powder is polyimide:heat conductive powder =90–70% by weight:10–30% by weight, preferably 85–75% by weight:15–25% by weight, the sum of both being 100% by weight.

The polyimide film of the invention may have a fluororesin film layer formed on the outer surface. Said fluororesin film layer is useful in that it improves the releasability of the toner image acceptor (e.g. paper, carton, OHP sheet) from the heat-conductive polyimide film. The term "outer surface" means either surface when said heat-conductive polyimide film is planar, whereas when it has an endless cylindrical form, said term means the outside surface. The fluororesin film layer has a thickness of about 3 to 30 $\mu$m, preferably about 5 to 10 $\mu$m. Usable as said fluororesin are a wide variety of fluororesins suited for use as mold release or parting agents, for example polytetrafluoroethylene resins, tetrafluoroethyl-ene-hexafluoropropylene copolymer resins and tetra-fluoroethylene-perfluoroalkyl vinyl ether copolymer resins. Said fluororesin film layer can be formed in the conventional manner, for example by film coating of the polyimide film or by bonding a fluororesin film and the polyimide film using an adhesive.

The above-mentioned heat-conductive polyimide film can be produced by various conceivable methods without any particular restriction provided that the heat-conductive powder can be dispersed with a concentration gradient. Preferred, however, is the centrifugal casting method which utilizes centrifugal forces. The centrifugal casting method is preferred because this technology makes it possible to control the gradient dispersion profile with ease, gives films with high dimensional precision, and enables molding in an endless cylindrical film form as well. Therefore, in the following, a preferred production process using this centrifugal method is described.

First, for preparing the poly(amic acid), which is the base material, an organic acid dianhydride, such as pyromellitic dianhydride, 2,2',3,3'-biphenyl-tetracarboxylic acid dianhydride, 3,3',4,4'-benzo-phenonetetracarboxylic acid dianhydride or bis(2,3-dicarboxyphenyl)methane dianhydride, and an organic diamine, such as p-phenylenediamine, 4,4'-diamino-diphenylmethane or 4,4'-diaminodiphenyl ether, are subjected, in equivalent amounts, to polycondensation in an organic polar solvent, such as dimethylacetamide or N-methylpyrollidone, at a low temperature not higher than ordinary temperature. A poly (amic acid) with a high molecular weight is produced and it is in the dissolved state in said solvent. The amount of said solvent is preferably such that the concentration of the poly(amic acid) amounts to about 5 to 25% by weight. This is because such amount of the solvent can allow the polycondensation reaction to proceed smoothly and bring about a slurry viscosity suited for centrifugal casting.

Then, to the poly(amic acid) solution mentioned above, there is added the above-mentioned heat-conductive powder in an amount of 10 to 30% by weight, preferably 15 to 25% by weight, relative to the above-mentioned poly (amic acid) on a solid matter basis. When the addition level of said powder is less than 10% by weight, it is not easy to attain gradient dispersion and, even if attained, the gradient dispersion can not lead to such a satisfactory level of improvement in thermal conductivity as desired. Conversely, when the addition level exceeds 30% by weight, the mechanical characteristics inclusive of flex resistance, in particular, decrease markedly and the centrifugal castability is poor and, as a result, the film is poor in smoothness.

The above-mentioned powder has a particle size of about 0.1 to 3.0 $\mu$m, preferably 0.1 to 1.0 $\mu$m. When the particle size is too small, it is not easy to attain gradient dispersion. When, conversely, it is too large, local distribution in the superficial layer will result rather than gradient dispersion.

As regards the particle size distribution, an adequately broad range is rather preferred to a narrower range of distribution from the viewpoint of smooth progress of gradient dispersion. As regards the specific gravity, it is preferably selected from within the range of about 2 to 4, since, from the gradient dispersibility viewpoint, favorable results can hardly be obtained with lighter or heavier powders.

The shape of powder particles may be spherical, flat or fibrous. When first priority is given to high thermal conductivity, then a fibrous form is preferred. When priority is given to surface smoothness, a flat form is preferred.

The poly(amic acid) solution supplemented with an amount, within the above range, of the heat-conductive powder is stirred using a high power mixer until a state of sufficiently uniform dispersion is obtained. To attain uniform dispersion in this stage is also important for improving gradient dispersibility in centrifugal casting.

In cases where the addition of said powder results in an unnecessarily high solution viscosity, the viscosity can be adjusted to a desired level by adding the organic polar solvent mentioned above. The solution viscosity is not critical but it is recommended to adjust the viscosity to a level within the range of about 400 to 1,200 cps.

On the occasion of adding the above-mentioned powder, a further component or components may be added. For improving the centrifugal castability, for instance, it is conceivable that a small amount of a surfactant be added. Among various surfactants, fluorine-containing organic compounds of the anion or nonion type are preferred examples.

More specifically, among the commercially available surfactants, there may be mentioned, for example, ET-TOP (trademark) type EF-104 and type 351, which are products of Mitsubishi Materials.

The heat-conductive powder-containing poly(amic acid) solution adjusted to a desired viscosity is subjected to centrifugal casting using a centrifugal casting machine. Said casting machine comprises a rotating drum having a desired width and a desired inside diameter, and provided with a heating means and a rotating means. The inner surface of said drum is sufficiently mirror-finished and ring frames with an adequate height are provided on both inner peripheral edges.

The casting using such a casting machine is performed, for example, by pouring a predetermined amount, sufficient to give a film with a predetermined thickness, of the above-mentioned poly(amic acid) solution onto the inner drum surface of said casting machine while rotating the drum slowly. After completion of the pouring of said predetermined amount, the rotation is gradually accelerated. Upon arrival at a required number of revolutions, the whole drum is heated gradually and said number of revolutions is maintained for a predetermined period of time. It is recommended that the heating temperature be not higher than 190° C., since the primary purpose in this stage is to remove the solvent from the solution by evaporation while keeping good isolation and suppressing the imide ring closure reaction as far as possible. The heating is performed at a temperature of about 100 to 190° C. for a predetermined period of time while rotating the drum. The required number of revolutions depends on the cylinder diameter and driving roll diameter. When the cylinder diameter is 25 mm $\phi$, for instance, said number is about 330 rpm. For conversion to an endless cylindrical poly(amic acid) film, it is recommended that the film be once peeled off and taken out of said drum. This is because to carry out the imide ring closure reaction uninterruptedly in said drum by heating at a high temperature of not lower than 190° C. would unfavorably deteriorate the film surface precision parameters (thickness, bubbles, etc.).

The above-mentioned poly(amic acid) film has to be converted then to a polyimide film by effecting the imide ring closure reaction. For this reaction, the poly(amic acid) film is heated generally at a temperature of 300 to 450° C. for a predetermined period of time at ordinary pressure or under reduced pressure, whereupon imidation takes place as a result of dehydration reaction. In this heating step, it is more desirable to raise the temperature stepwise gradually as compared with abruptly raising the temperature to the predetermined level.

In said step of heating, it is also recommended, for shape stabilization and reverse surface planishing, that the cylindrical poly(amic acid) film once taken out be mounted on a planished mandrel and then heated.

The heating at said temperature is performed for imidation. Simultaneously, however, the byproduct condensation water and the remaining trace amount of the organic polar solvent are entirely removed. Therefore, the cylindrical polyimide film finally obtained has a slightly reduced size.

In the above, a typical example of the process for producing thermosetting polyimide films has been described. In the case of thermoplastic polyimide films, too, it is recommended that they be produced according to the above-mentioned production example. In this case, it is also possible to conduct the polycondensation of starting materials to poly(amic acid) and the imidation without interruption in one reaction system to thereby omit the separate heating step for the imide ring closure reaction.

As regards the starting materials for polycondensation which are used in producing thermoplastic polyimide films, the organic acid dianhydride may be any of those mentioned above for thermosetting polyimide production while the organic diamine is selected from, for instance, among bis[4-[3-(4-aminophenoxy)benzoyl] phenyl] ether, 4,4'-bis(3-aminophenoxy)biphenyl, bis[4-(3-aminophenoxy)phenyl] sulfide, 2,2'-bis[4-(3-aminophenoxy)phenyl]propane and the like. Thermoplastic polyimides are obtained by combinedly using said organic acid dianhydride and such organic diamines.

The thus-obtained polyimide film has high thermal conductivity in addition to excellent mechanical characteristics and heat and chemical resistance and therefore may be used in various fields as a medium for positive heating or, conversely, as a heat dissipating medium. As an example of the use as a heating medium, there may be mentioned the use as various heating rolls or heating belts. Said use includes, among others, the use as a member of the roll or belt for toner heating and fixation in laser printers and electrophotographic copying machines, the use as a member of the heating and image-transferring belt in ink replenishing type transfer printers, the use in rolls for heating adhesives and the like, and the use in printed IC boards where the heat dissipating property is utilized.

For the use in the form of a heating roller or heating belt, it is a very important factor that the film has an endless cylindrical form. The above-mentioned centrifugal casting technique, in particular, can give endless cylindrical films of higher quality (precision in film thickness; presence or absence of bubbles) and higher performance (uniform thermal conductivity) as compared with any other processes, for example the process comprising joining both ends of a film by butting or polymerization to make said film endless, the process comprising casting into a cylindrical mold and the process comprising coating a cylindrical body by immersion.

As a specific mode of use as a toner heating member among the above-mentioned examples of use, there may be mentioned the general use as a fixing roll or fixing belt.

For use in a roll form, for instance, a heating source is disposed in the inside of said film and a rotating mechanism is provided on an edge line of said film to rotate said film. Another embodiment comprises fitting said film rigidly around an aluminum tube, setting a heat source in said aluminum tube, and rotating the aluminum tube.

On the other hand, in an example of the mode of use in a belt form, said belt is mounted, at one end, on a driving roller for rotating said belt, a heating source having a heating surface adapted for face-to-face contact is provided at the opposite end, and the belt is rotated in a manner such that it slides on the heating surface. In another example, three rolls are arranged in positions forming a triangle, two of the rolls are used for driving the belt and the remaining one is used as a heating roller with a heating source provided therewithin. The fixing roll or fixing belt having such a mechanism as mentioned above is provided in the toner heating and fixing section for functioning as such.

In using the above-mentioned polyimide film, the face or reverse surface thereof may be coated with some other resin, if necessary. When, for instance, the article heated is hardly released from said film, the film surface in question may be coated with a fluororesin emulsion, followed by baking. Particularly when the film is used in a roller or belt form, the polyimide film is inserted into an endless cylindrical film of a fluororesin as molded beforehand in approximate contact, followed by heating at a temperature lower than the melting point of said resin for tight fixation utilizing the shrinkage thereof. Since the coat layer is very thin, it has substantially no effect on the thermal conductivity; it allows rapid and perfect release, to prepare for heating the next article to be heated.

By what mechanism the mechanical characteristics are prevented from decreasing and a high level of thermal conductivity is attained in accordance with the present invention is not certain. In view of the prior art dispersion techniques, it is quite unexpected that these characteristic features can be simultaneously brought about by the special mode of dispersion, namely gradient dispersion. The present invention thus can be said to be very useful in the future development of new technologies.

The advantages of the film of the present invention over the prior art heat-conductive polyimide films include the following.

It is a well-balanced heat-conductive polyimide film with the thermal conductivity having been doubled and yet the mechanical characteristics little affected. In particular, when the heat-conductive powder has a particle size of about 0.1 to 3.0 $\mu$m, preferably 0.1 to 1.0 $\mu$m, gradient dispersion can be attained to a satisfactory extent, thus resulting in a very satisfactory global evaluation inclusive of mechanical characteristics and thermal conductivity.

The particle size of said powder is about 0.1 to 3.0 $\mu$m, preferably 0.1 to 1.0 $\mu$m. When said size is too small, it is not easy to attain gradient dispersion. Conversely, when it is too large, powder particles tend to be locally concentrated in the superficial layer, not distributed in a gradient.

Since the film mentioned above can easily be obtained in the form of a high precision endless cylinder, said film can be used effectively as a high-quality, high-performance roll or belt member for heating various articles.

Since, conversely, said film is capable of moderately dissipating heat, the use thereof in application fields where heat accumulation may cause problems, in particular in the field of multilayer printed IC boards, is effective since it has good heat resistance and chemical resistance as well.

EXAMPLES

The following examples and comparative examples illustrate the present invention in further detail.

In the examples, the thermal conductivity, and the Young's modulus and stress crack (flexural fatigue), which were employed as testing items for evaluating two typical mechanical characteristics, were measured in the following manner.

Thermal conductivity . . . using Rigakuls laser-based apparatus for measuring thermal constants.
Young's modulus . . . using Toyo Seiki's Strograph R-200.
Stress crack . . . using Toyo Seiki's MIT-D.

Example 1

A 200.0 g portion of a poly(amic acid) solution (solids concentration: 18% by weight) obtained by polycondensation of equivalent amounts of pyromellitic acid dianhydride and 4,4'-diaminodiphenyl ether in N-methylpyrrolidone at ordinary temperature (20° C.) was weighed, and 72.3 g of N-methylpyrrolidone was added thereto, followed by thorough mixing to give a solution (hereinafter, solution A). To this was added 9.0 g (20% by weight based on the total solids) of boron nitride with a mean particle size of 0.25 $\mu$m (Boronnite FS-1; product of Mizushima Gokintetsu). After attaining sufficiently uniform dispersion by stirring in a ball mill, the mixture was degassed under vacuum to give a heat-conductive powder-containing poly(amic acid) solution (hereinafter, solution B).

Separately, a centrifugal casting machine was prepared by mounting a metal drum (with a mirror-finished or planished inner surface) having a width of 440 mm and an inside diameter of 25 mm on two rotating rollers so that rotation of said rollers could cause rotation of said drum. The whole system was placed in a temperature-controllable hot air heating apparatus for enabling heating of said casting machine.

A ring frame with a width of 2 mm and a height of 2 mm was provided on each inner peripheral edge of said drum to thereby prevent leakage from the drum.

Then, 16.5 g of solution B was weighed and poured onto the inside surface of the slowly rotating drum of said centrifugal casting machine. Then, the rotating speed was gradually increased. At the time when said speed arrived at 329 rpm, the hot air heating apparatus was started and the whole casting machine was heated gradually. After arriving at 190° C., that temperature was maintained for 45 minutes while the rotation was continued. In that manner, smooth casting was realized and film molding was effected with good precision, while the N-methylpyrrolidone was simultaneously evaporated and removed out of the system, to give a shape-retaining endless poly(amic acid) film. At the end of the 45 minute rotation, the heating was stopped and, at the time when the whole system returned to ordinary temperature, the rotation was stopped and the film was peeled off.

The thus-obtained poly(amic acid) film was mounted on a metal mandrel (mirror surface with a surface roughness of not greater than 1.6 s) having an outer diameter of 23.95 mm and a width of 400 mm, the whole was placed in a hot air drying apparatus, the temperature was gradually raised to 450 ° C. over 3 hours, and heating was continued at that temperature for 10 minutes. Thereafter, the heating was stopped and, after cooling to ordinary temperature, the film was pulled off from the mandrel. Infrared spectrophotometry confirmed that the above heating treatment had resulted in imidation and in complete removal of the remaining trace amount of N-methylpyrrolidone. An electron photomicrograph of the film obtained in Example 1 is shown in FIG. 2. As is evident from FIG. 2, the boron nitride powder was dispersed with a concentration gradient from the face side (right) to the reverse side (left).

The thermosetting aromatic polyimide film in an endless form as obtained in the above manner had a thickness of 50 $\mu$m±2 $\mu$m, an inside diameter of 24 mm and a width of 400 mm. The face and reverse side surface roughnesses (Rz) (10 point mean roughness) were not greater than 1 $\mu$m. A portion of said film was cut off and the section thereof was magnified under a scanning electron microscope (hereinafter, SEM) for observing the state of dispersion of the boron nitride powder, whereby it was confirmed that said powder was dispersed with a concentration gradient, namely with the concentration gradually increasing from the reverse side toward the face side (the side facing the inside of the drum of the centrifucal casting machine). The results of evaluation of the thermal conductivity and other characteristics are summarized in Table 1.

TABLE 1

|  | Thermal conductivity (w/mk) | Mechanical Characteristics | | 
| --- | --- | --- | --- |
|  |  | Young's modulus (kg/cm$^2$) | Stress crack (times) |
| Example | | | |
| Example 1 | 0.56 | 7.68 × 10$^4$ | 90072 |
| Comparative Example 1 | 0.60 | 8.02 × 10$^4$ | 53824 |
| Comparative Example 2 | 0.33 | 7.12 × 10$^4$ | 92287 |
| Comparative Example 3 | 0.29 | 6.38 × 10$^4$ | 106785 |

Comparative Example 1
(A Case in Which the Heat-conductive Powder is Dispersed Uniformly)

A 30 g portion of solution B prepared in Example 1 was weighed and cast uniformly onto a glass plate horizontally set in a hot air dryer. After the start of heating, the temperature was raised gradually to 150° C. and then maintained at that temperature for 60 minutes. The poly(amic acid) film formed in this manner was peeled off from the glass plate and then placed on a metal plate having a smooth surface (mirror surface with a surface roughness of not more than 1.6 s) in such a manner that the surface of the film which had been in contact with the glass plate was exposed. The film was then re-heated by gradually raising the temperature to 450° C. over 3 hours and then maintaining that temperature for 10 minutes. The heating was then stopped and, after cooling to ordinary temperature, the film was peeled off from the metal plate surface.

Figure 3:
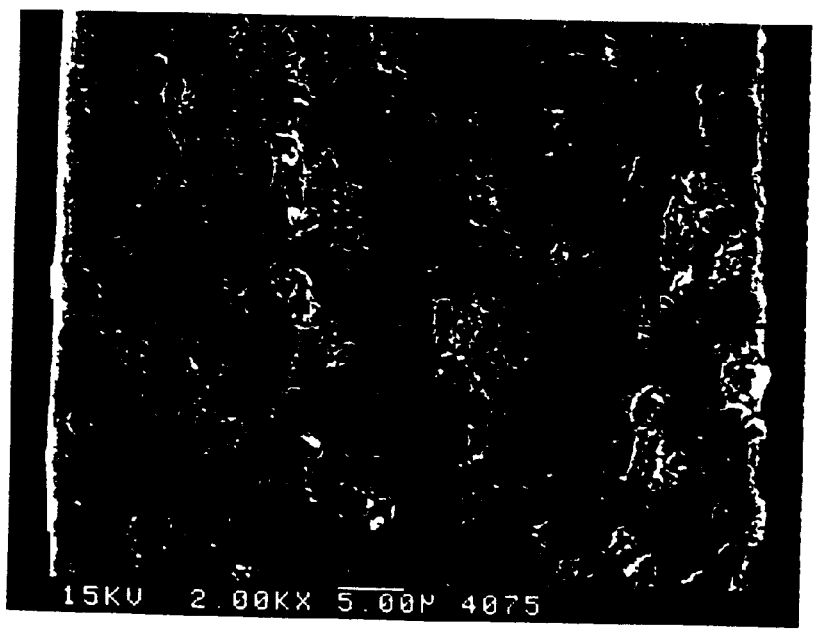
FIG. 3 is an electron photomicrograph of the film obtained in Comparative Example 1.

The thus-obtained film was a film of the same polyimide as that of Example 1. However, it was confirmed by observing the section thereof under a SEM that the dispersion of the boron nitride powder was uniform throughout the whole section. The thickness was 50 μm±3 μm and the face and reverse side surface roughnesses were: Rz≦1 μm. The thermal conductivity and other evaluation results are summarized in Table 1. An electron photomicrograph of the film obtained in Comparative Example 1 is shown in FIG. 3. As is evident from FIG. 3, the boron nitride powder in the film of Comparative Example 1 was found dispersed uniformly from the face side (right) to the reverse side (left)

Comparative Example 2
(A Two-layer Case in Which the Heat-conductive Powder is Dispersed in the Face Side Layer Alone)

First, 15 g of solution B prepared in Example 1 was weighed and cast onto a glass plate and heated in the same manner as in Comparative Example 1, whereby a poly(amic acid) film (hereinafter, face side layer) was molded. A portion of said film was peeled off and subjected to thickness measurement. The thickness was 30 to 33 μm. Then, the poly(amic acid) film on the glass plate, with the boron nitride powder uniformly dispersed therein, was coated with 10 g of solution A, which was the base solution used in Example 1. The subsequent heating, which was performed in the same manner as mentioned above, gave a two-layer poly(amic acid) film. This film had a total thickness of 75 to 80 μm. Said film was then peeled off from the glass plate and placed on a metal plate surface in the manner of sticking in the same manner as in Comparative Example 2 and subjected to heating at 450° C. in the same manner as above for the specified period of time, followed by cooling and peeling off from the metal plate, to give a polyimide film with filler dispersion on one side alone.

The above-mentioned polyimide film had a thickness of 50 to 54 μm and showed a tendency to slight convex curling facing the face layer side. By observation of the section of this film under a SEM, it was confirmed that the boron nitride powder was dispersed in the face side layer but was absent in the reverse side layer.

Figure 4:
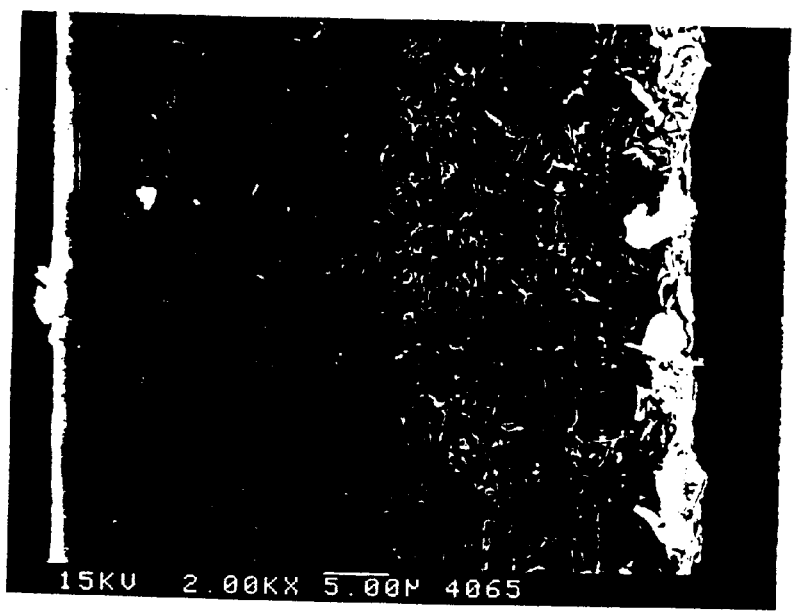
FIG. 4 is an electron photomicrograph of the film obtained in Comparative Example 2.

The thermal conductivity and other evaluation results for this film are summarized in Table 1. An electron photomicrograph of the film of Comparative Example 2 is shown in FIG. 4. As is evident from FIG. 4, the boron nitride powder in the film of Comparative Example 2 was found localized in the face side (right) and almost absent in the reverse side (left).

Comparative Example 3
(A Case in Which no Heat-conductive Powder is Used)

Figure 5:
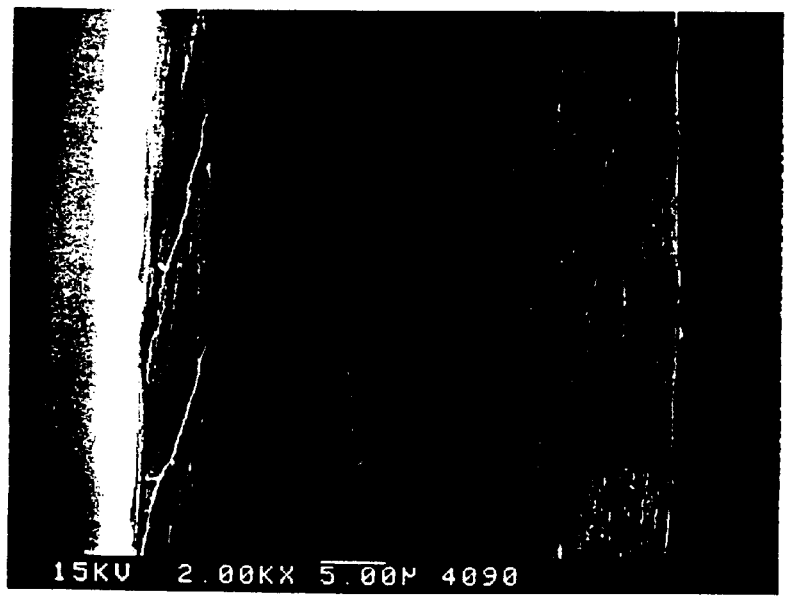
FIG. 5 is an electron photomicrograph of the film obtained in Comparative Example 3.

A 14.7 g portion of solution A (the base solution of Example 1) was weighed and molded into a poly(amic acid) film by centrifugal casting, followed by heating of said film at 450° C. for conversion to an endless polyimide film, using the same conditions as in Example 1. The film obtained had an inside diameter of 24 mm and a width of 400 mm. The face and reverse side surface roughnesses were the same as in Example 1. The thermal conductivity and other evaluation results for this film are summarized in Table 1. An electron photomicrograph of the film obtained in Comparative Example 3 is shown in FIG. 5.

Example 2

The seamless polyimide tube obtained in Example 1 was cut to a width of 300 mm and mounted on a roll mechanism in the heating and fixing section of a laser printer and checked for its performance in toner image fixation.

Said roll mechanism is schematically shown in FIG. 1. The reference numeral 1 indicates said polyimide tube having a 10 μm thick coating of a fluororesin (copolymer of tetrafluoroethylene and a perfluoroalkyl vinyl ether). A circular arc ceramic heater 2 provided within said tube heats the inside of tube 1. A rotating shaft 5 is fixed on a ring on one side of tube 1 and is engaged with a rotating driving source (not shown). Therefore, as said rotating driving source rotates, the tube 1 rotates and slides on the surface of ceramic heater 2. A backup roll 3 is facing to the ceramic heater 2. Fixation of a toner image formed by means of a laser source and transferred to a paper or like sheet 4 is completed by the heat (heat for fusion of the toner) from the tube surface and the pressure applied by said roll 3.

Using a 600 dpi laser printer and, as an original, a test chart comprising 4 dot wide lines at 20 dot intervals, printing was performed on paper sheets at a ceramic heater temperature of 200° C. and a printing speed of 8 sheets per minute (commercial speed) and the state of fixation was checked. For the purpose of checking, the fixed image on each print obtained was rubbed with the forefinger strongly pressed against said image by moving said finger forward and backward three times. No disturbance in the fixed image or contamination of the forefinger with the toner was observed at all.

Comparative Example 4

The polyimide film obtained in Comparative Example 1 was subjected to fixation performance testing under the same conditions as used in Example 2. After one forward and backward rubbing motion, the fixed image was disturbed and the forefinger was slightly blackened by the toner.

The results indicate that, at the commercial speed, the temperature failed to reach the level required for fixation (fusion) of the toner because of poor thermal conductivity, as compared with Example 2.

We claim:

1. A heat-conductive polyimide film which comprises a a polyimide film and, dispersed therein with a concentration gradient, a heat-conductive powder in an amount of 10 to 30% by weight, said heat-conductive powder having a particle size of about 0.1 to 3.0 μm and a specific gravity within the range of about 2 to 4.

2. A heat-conductive polyimide film as claimed in claim 1, wherein said heat-conductive powder is at least one member selected from the group consisting of boron nitride, aluminum oxide, beryllium oxide and aluminum nitride.

3. A heat-conductive polyimide film as claimed in claim 1, wherein the polyimide film is a thermosetting aromatic polyimide film.

4. A heat-conductive polyimide film as claimed in claim 1, wherein a fluororesin film layer is formed on the outer surface of the polyimide film.

5. A heat-conductive polyimide film as claimed in claim 1 which has an endless cylindrical form.

6. A process for producing said heat-conductive polyimide film of claim 1 which comprises subjecting a polyimide precursor solution containing 10 to 30% by weight of a heat-conductive powder as a solid to centrifugal casting to give an endless cylindrical polyimide precursor film and heating this film to thereby effect imide ring closure.

7. A process for fixing the toner on a toner image-carrying sheet which comprises using a heated fixing roll comprising the heat-conductive polyimide film of claim 1 for fixing the toner on the toner image-carrying sheet.

* * * * *